United States Patent [19]

Murarka et al.

[11] Patent Number: 6,069,292

[45] Date of Patent: May 30, 2000

[54] PROCESS FOR REMEDIATING SOILS CONTAMINATED WITH POLYCYCLIC AROMATIC HYDROCARBONS AND CHLORINATED PHENOLS

[75] Inventors: Ishwar P. Murarka, Palo Alto, Calif.; Benjamin J. Mason, Grants Pass, Oreg.; Ronald C. Sims, Logan, Utah

[73] Assignee: Utah State University, Logan, Utah

[21] Appl. No.: 08/935,114

[22] Filed: Sep. 18, 1997

[51] Int. Cl.[7] .................................. A62D 3/00; C07C 1/00
[52] U.S. Cl. ...................... 588/227; 588/210; 588/212; 204/157.15
[58] Field of Search ...................... 204/157.15; 588/210, 588/212, 227

[56] References Cited

PUBLICATIONS

Treatment of Pentachlorophenol (PCP)–Contaminated Soil Using Enhanced Unsaturated Flow and Photodegradation. M. Allan Cooley, Utah State University, Thesis, 1994. No Month Available.

Treatment of Pentachlorophenol (PCP)–Contaminated Soil Using Indigenous Biological Degradation and Photodegradation. Preston Chad Ellis, Utah State University, Thesis, 1995. No Month Available.

Use of Enhanced Bioremediation at Bonneville Power Administration's Ross Complex Eastwood Pole Storage Yard, Vancouver, Washington. Dr. Benjamin J. Mason and Dr. Ishwar P. Murarka, Oct. 8, 1996.

Mason, "Use of Enhanced Bioremediation at Bonneville Power Administration's Ross Complex East Wood Pole Storage Yard Vancouver, Washington", pp. 1 to K–6, Oct. 8, 1996.

Ellis, "Treatment of Pentachlorophenol (PCP)–Contaminated Soil Using Indigenous Biological Degradation and Photodegradation", pp. 1–194, No Month Available, 1995.

*Primary Examiner*—Kathryn Gorgos
*Assistant Examiner*—Edna Wong
*Attorney, Agent, or Firm*—Flehr Hohbach Test Albritton & Herbert LLP

[57] ABSTRACT

A process for removing contaminants from a soil sample including the steps of removing fine soil particles from the soil sample, reducing the amount of contaminants in the fine soil particles by applying a solvent to the fine soil particles to dissolve the contaminants carried by the fine soil particles and radiating the surface layer of the fine soil particles to ultraviolet light having a wavelength selected to degrade the contaminants in the surface layer of the fine soil particles, and separately treating the coarse soil particles to reduce the level of contaminants in the coarse soil particles.

17 Claims, 10 Drawing Sheets

FIG_1

FIG_2

FIG_3

FIG_4

FIG_5

FIG_6

FIG_7

FIG_8

FIG_9

FIG_11

FIG_10

FIG_12

FIG_13

FIG_14

FIG_15

FIG_16

FIG_17

PROCESS FOR REMEDIATING SOILS CONTAMINATED WITH POLYCYCLIC AROMATIC HYDROCARBONS AND CHLORINATED PHENOLS

BRIEF DESCRIPTION OF THE INVENTION

This invention relates in general to the remediation of contaminated soil and, more particularly, to a method of reducing the level of polycyclic aromatic hydrocarbons and chlorinated phenols in soil.

BACKGROUND OF THE INVENTION

Soil exposed to large quantities of chemicals such as wood preserving chemicals, petroleum products, manufactured gas plant wastes and the like may become contaminated with chlorophenols, volatile organic compounds and polycyclic aromatic hydrocarbons (PAHs). Pentachlorophenol (PCP), a substance commonly used as a wood preservative or pesticide, and other chlorinated phenolic compounds become associated with the soil when released into the environment. Because these substances are considered toxic chemicals, a process for successfully and efficiently reducing the amount of PCP and PAHs in soil to acceptable levels is desired.

Biological degradation is one method currently employed in the treatment of PAHs and PCP contaminated soils. This method relies upon microorganisms in the soil to degrade the PCP and PAHs. However, biological degradation is a slow and time consuming process. The toxicity of the contaminants, recalcitrance of the target chemicals, and the slow rate of diffusion of the PCP and/or PAHs carrying non-aqueous phase liquid through the soil matrix can interfere with the degradation process. Moreover, the microorganisms require specific soil conditions, such as the availability of required nutrients, the oxygen and moisture content in the soil, and the soil pH.

Photodegradation or photolysis is another method of reducing contaminants through the absorption of light energy and the use of the absorbed energy to break chemical bonds. PCP in aqueous solution has been degraded by exposing the solution to ultraviolet radiation. However, photodegradation of PCP in soil is more difficult because the light required to degrade the contaminants typically has a penetration depth of less than 0.3 mm, essentially limiting photolysis to the contaminants in the surface layer of the soil. The use of solvents such as ethanol to extract the contaminants from the soil and carry the contaminants to the soil surface has been studied. P. C. Ellis, *Treatment of Pentachlorophenol (PCP) Contaminated Soil Using Indigenous Biological Degradation and Photodegradation*, 1995, M.S. Thesis, Utah State University, Logan, Utah; M. A. Cooley, *Treatment of Pentacholorphenol (PCP)-Contaminated Soil Using Enhanced Unsaturated Flow and Photodegredation*, 1994, M.S. Thesis, Utah State University, Logan, Utah. In the processes studied in the theses, ethanol was injected into the bottom of a pan without saturating the soil and allowed to migrate upwardly through the contaminated soil through capillary action. The soil was exposed to light for photodegration of the contaminants carried to the soil surface by the ethanol. While this process showed satisfactory results compared to biodegradation processes in the laboratory, degradation of the contaminants occurred at a significantly slower rate when this process was employed in the field.

A process of efficiently and quickly reducing the amount of contaminants in soil is desirable. A process which may be used to degrade contaminants when employed in the field, allowing the contaminated soil to be treated in both a time-efficient and cost-efficient manner, is also desirable.

OBJECTS AND SUMMARY OF THE INVENTION

It is a primary object of this invention to provide a process for reducing the level of contaminants in soil.

It is a further object of this invention to provide a process for reducing the level of PCP and/or PAHs in contaminated soil.

It is another object of this invention to provide a process for treating contaminated soil through photolysis of the contaminants.

A more general object of this invention is to provide an efficient and reliable method of removing PCP and/or PAHs from contaminated soil in the field.

In summary, this invention provides a process for reducing contaminants in a soil sample which is particularly suitable for efficiently treating soil in the field. The method includes separating the soil sample into a first batch having fine soil particles and a second batch having coarse soil particles. Solvent is added to the fine soil particles to dissolve the contaminants carried by the fine soil particles. The surface layer of the fine soil is exposed to ultraviolet light having a wavelength producing photolysis of the contaminant to reduce the level of contaminants in the surface layer of the fine soil particles. The coarse soil particles are treated separately to reduce the level of contaminants in the coarse soil particles.

Additional objects and features of the invention will be more readily apparent from the following detailed description and appended claims when taken in conjunction with the drawings.

DETAILED DESCRIPTION OF THE INVENTION

Reference will now be made in detail to the present embodiments of the invention, which are illustrated in the accompanying figures. Turning now to the drawings, wherein like components are designated by like reference numbers throughout the various figures, attention is directed to FIG. 1.

Figure 1:
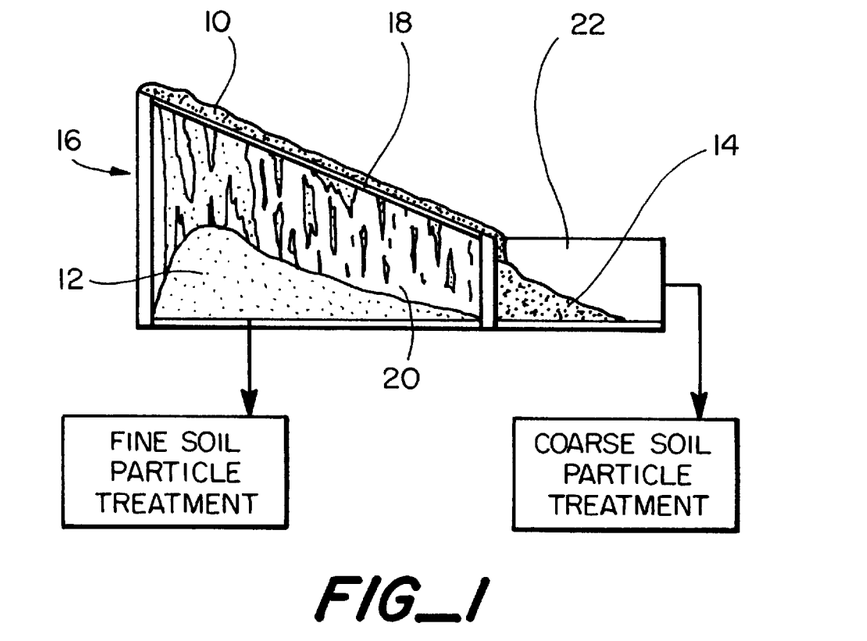
FIG. 1 shows a schematic flow chart showing the treatment of contaminated soil in accordance with the present invention.

The soil remediation process of this invention, shown schematically in FIG. 1, is particularly suitable for reducing the level of contaminants such as PCP and PAHs in contaminated soil. The first stage of treatment in accordance with the process of this invention is to separate the contaminated soil 10 into two fractions, the first fraction including fine soil particles 12 and the second fraction including coarse soil particles 14. In the illustrated embodiment, the contaminated soil is classified by size using a soil classifier 16 although it is to be understood that other classification devices may be used in accordance with this invention. The contaminated soil is deposited at the upper end of an inclined vibratory surface 18. As the soil 10 travels down the surface 18, fine soil particles fall into a first compartment 20 below the inclined surface 18 while the larger soil particles roll off the end of the surface 18 into a second compartment 22.

Preferably, the openings formed through the inclined surface 18 are adapted to permit particles having a maximum diameter less than ⅜ inch to fall into the first compartment 22, with those particles having a maximum diameter of ⅜ inch or greater being falling into the second compartment 22. Separating the contaminated soil 10 prior to treatment is of particular advantage. The fine particles collected in the first compartment 20 are essentially of a substantially uniform size, facilitating the transport of fluid through the soil matrix by capillary action or unsaturated flow. Prior to separation, the combination of coarse soil particles and fine soil particles creates a non-uniform soil matrix which reduces the effectiveness of transport of the solvent through the soil by capillary action. With the improved flow obtained by removing the fine soil particles for separate treatment, contaminants dissolved in the solvent are carried toward the soil surface at a greater rate, facilitating the removal of the contaminants from the soil particles for treatment. Since the fine soil particles 12 typically have a higher contamination level than the coarse soil particles 14, improving the rate at which the contaminants may be removed from the fine soil particles is of particular advantage.

The contaminants have a tendency to be sorbed into the micropores of the soil particles. Thus, decontamination of the soil requires that the contaminants be extracted from the micropores and made available for photolysis. The diffusion of the contaminants from the soil micropores and the transport of the contaminants from the surface of the soil particle to the surface layer of the soil is described using the following diffusion equation:

$$D_{eff} = \frac{D_m \phi}{(1-\phi)\rho_s K_d + \phi}$$

where:
$D_{eff}$=the effective diffusion coefficient of the contaminant in the soil particle (cm/sec)
$D_m$=the diffusion coefficient of the contaminant in aqueous pore liquid ($10^{-5}$ cm/sec)
$\phi$=porosity of the soil (cm$^3$/cm$^3$)
$\rho_s$=bulk density of the soil (g/cm$^3$)
$K_d$=the soil sorption coefficient (L/kg)
and the following retardation equation:

$$R = 1 + \frac{\rho_s K_d}{\Theta}$$

where:
R=the velocity of the fluid or solvent through the soil relative to the velocity of the dissolved contaminant ($V_{fluid}/V_{contaiminant}$)
$\rho_s$=bulk density of the soil (g/cm$^3$)
$K_d$=the soil sorption coefficient (L/kg)
$\Theta$=soil moisture content (cm$^3$/cm$^3$).

The value of the effective diffusion coefficient of the contaminant, $D_{eff}$, is most effected by the value of the soil sorption coefficient, $K_d$. Thus, a suitable solvent is added to the soil, decreasing the coefficient $K_d$, the effective diffusion rate of the PCP and PAH contaminants in soil is increased. Similarly, the value R decreases as soil sorption coefficient $K_d$ decreases such that the velocity of the solute-contaminant approaches the velocity of the solvent moving through the soil by diffusion and/or by advection.

Figure 2:
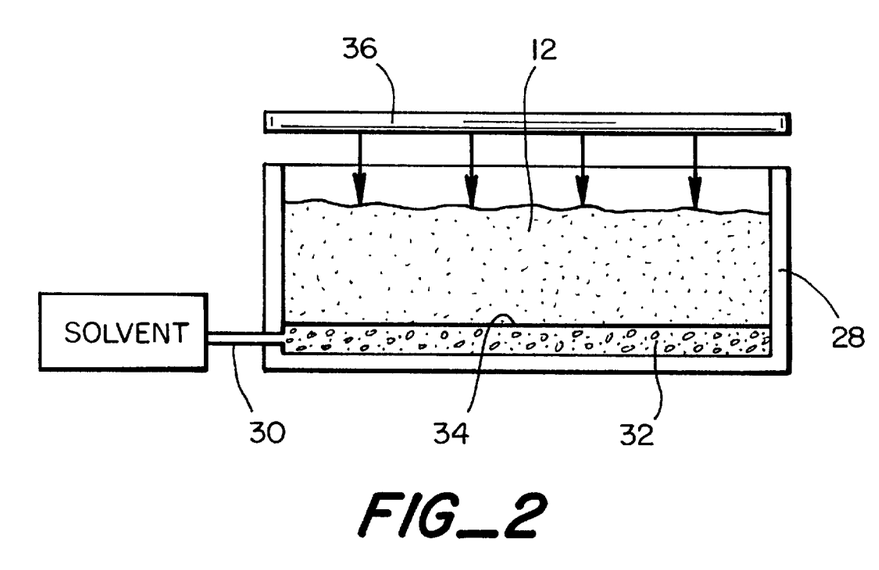
FIG. 2 shows a schematic flow chart showing the treatment of fine soil particles in accordance with a first embodiment of the present invention.

FIG. 2 schematically illustrates the treatment of the fine soil particles 12 in accordance with one embodiment of the invention. The soil particles 12 are placed in a reactor 28 with the particles having a depth in the range of about 30 cm to about 45 cm. The PCP and PAH molecules are released from the soil and transported by a solvent to the surface for photoremediation. As is shown in FIG. 2, a solvent is injected into the bottom of the reactor 28 through a delivery tube 30. In the illustrated embodiment, the solvent is a mixture of ethanol and water having an ethanol concentration of about twenty percent by volume. The solubility of PCP in ethanol is much greater than in an aqueous media, for example, at a pH of 4.7, PCP solubility in an aqueous media is 14 mg/L while PCP solubility in ethanol is 47,000 mg/L to 52,000 mg/L. However, it is to be understood that other solvents may be employed within the scope of this invention. Preferably, the selected solvent has a high capacity for solubilizing PAHs and PCPs and minimal interference, if any, with the absorption of UV radiation. Examples of suitable solvents include methanol, acetone, acetonitrile, as well as other solvents which provide the desired chemical interaction with the soil matrix and contaminants. As is shown schematically in FIG. 2, in the illustrated embodiment the reactor 28 is lined with a coarse sand, generally designated 32, covered by a suitable filter fabric 34 to facilitate the distribution of solvent across the bottom of the reactor 28.

The solvent migrates upwardly from the lining material through the soil via unsaturated flow, drawing the contaminants from the soil particles 12 into the mobile phase. The contaminants in the mobile phase are carried toward the surface by the migrating solvent.

A source 36 of ultraviolet (UV) radiation positioned above the reactor 28 is activated to radiate the surface layer of the soil. The term "surface layer" refers to the upper layer of the soil which is penetrated by the UV radiation. For maximum efficiency, solvent is added to the soil particles while the reactor 28 is exposed to the light source 36 so that the solvent is continuously carrying contaminants to the soil surface during degradation of the contaminants located in the surface layer. The wavelength of the UV radiation is selected to provide the optimum reaction rate for the particular contaminant in the soil. PCP absorbs light at wavelengths of 270 $\eta$m to 325 $\eta$m, with the strongest absorption occurring at 300 $\eta$m to 310 $\eta$m. The UV radiation source employed for treatment of PCP is preferably in the black light range and has a wavelength in the range of 300 $\eta$m to 400 $\eta$m. For PAH, the UV radiation preferably is in the germicidal range and has a wavelength in the range of 200 $\eta$m to 300 $\eta$m. The light energy is absorbed by the contaminant with the absorbed energy breaking the chemical bonds to thereby destroy or degrade the contaminant molecules. To simultaneously treat the soil to remove PCP and PAH contaminants, the reactor 28 may be exposed to both types of UV radiation sources.

The contaminants are removed from the soil in three steps—the solvent extracts the contaminants from the surface and the micropores of the soil particles, the solvent carries the solute contaminants toward the surface as the solvent migrates upwardly through the soil via unsaturated flow to decontaminate the soil beneath the surface layer, and the contaminants in the surface layer are destroyed through photolysis. The soil particles in the reactor 28 are periodically tested to measure the level of contaminants, with the solvent-UV radiation treatment of the fine soil particles continuing until the contaminant level in the soil drops to an acceptable level.

Figure 3:
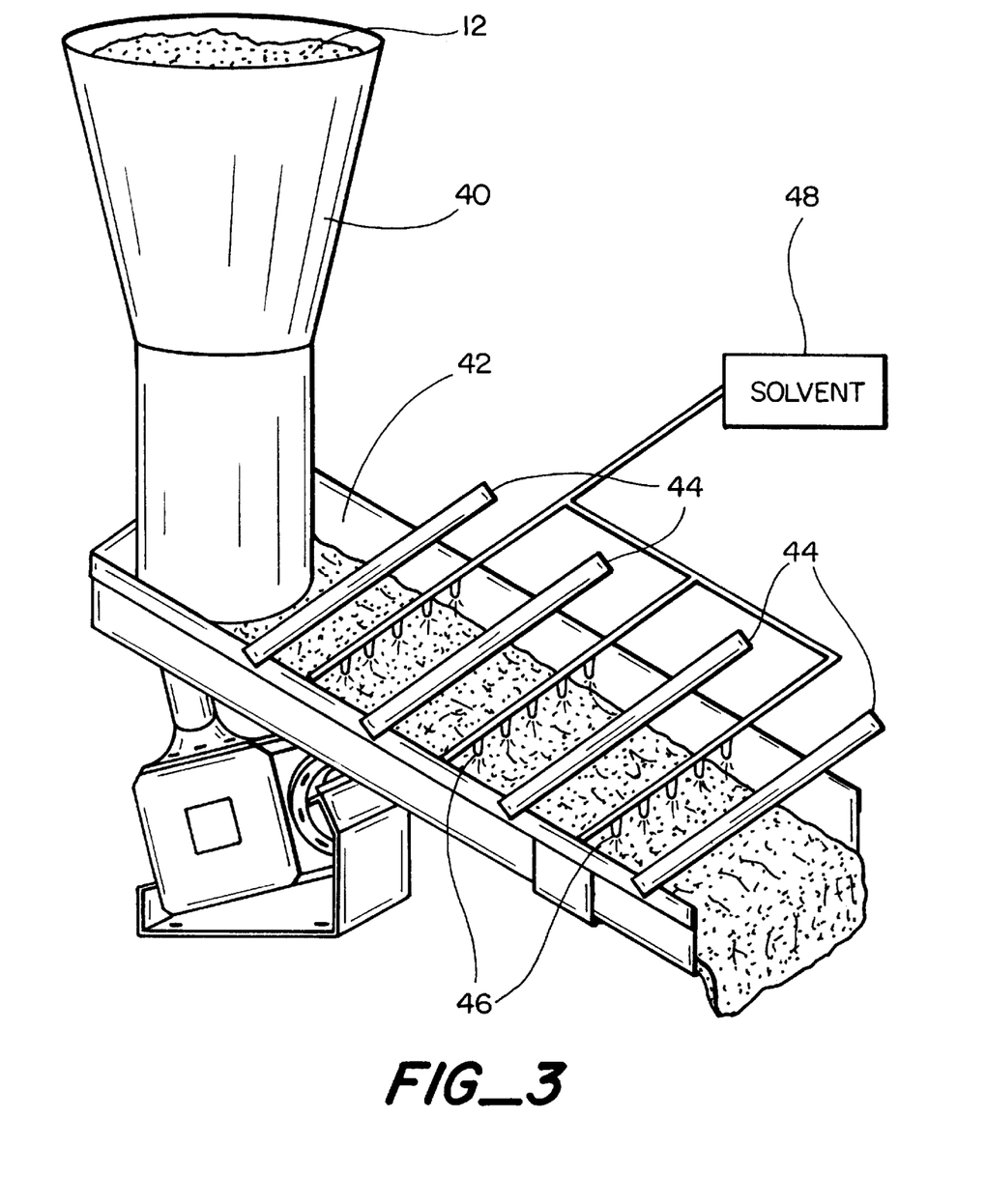
FIG. 3 shows a schematic flow chart showing the treatment of fine soil particles in accordance with a second embodiment of the present invention.

FIG. 3 diagrammatically illustrates the treatment of the fine soil particles 12 in accordance with another embodiment of the invention. The fine soil particles 12 are transferred to a storage hopper 40. The hopper 40 delivers a stream of the fine soil particles to a conveyor 42 at a delivery rate selected to deposit a thin layer of soil uniformly across the conveyor. The depth of the layer of soil particles 12 on the conveyor 42 is selected to achieve an optimum photodegradation rate of the contaminants carried by the fine soil particles. A suitable depth for the soil layer is in the range of 3 mm to 5 mm. The hopper 40 and conveyor 42 are configured for delivery and maintenance of the desired soil depth on the conveyor 42. In the illustrated embodiment, the conveyor 42 is provided by a vibratory feeder, although it is to be understood that other types of conveyors may be utilized within the scope of this invention.

A plurality of UV radiation sources 44, such as high intensity industrial UV lamps, are distributed along the conveyor 42. As in the previous embodiment, the UV sources 44 preferably provide light having a wavelength of about 200 $\eta$m to 300 $\eta$m for the photolysis of PAHs and a wavelength of about 300 $\eta$m to 400 $\eta$m for the photolysis of PCP. A combination of radiation sources may be employed for the simultaneous photodegradation of PCP and PAHs. Misters 46 positioned between adjacent rows of the UV radiation sources 44 are coupled to a solvent source 48 for spraying the soil particles on the conveyor 42 with solvent. Repeatedly spraying the soil particles with solvent encourages separation of the contaminants from the soil particles to increase the rate of photodegradation of the contaminants. As with the embodiment shown in FIG. 2, the solvent applied with the misters 46 may be an ethanol solution or another suitable solvent. The soil is tested as the soil particles exit the end of the conveyor 42 to determine whether the treated particles must be returned to the hopper 40 for additional treatment.

The treatment processes shown in FIGS. 2 and 3 are particularly suitable for removing PCP and PAH contaminants from fine soil particles, for example soil particles having a diameter less than ⅜ inch. The relatively uniform size of the fine soil particles facilitates the flow of the solvent through the soil matrix by capillary action. Separating the fine soil particles from the soil sample is of particular advantage for treatment in accordance with the embodiments of FIGS. 2 and 3.

Figure 4:
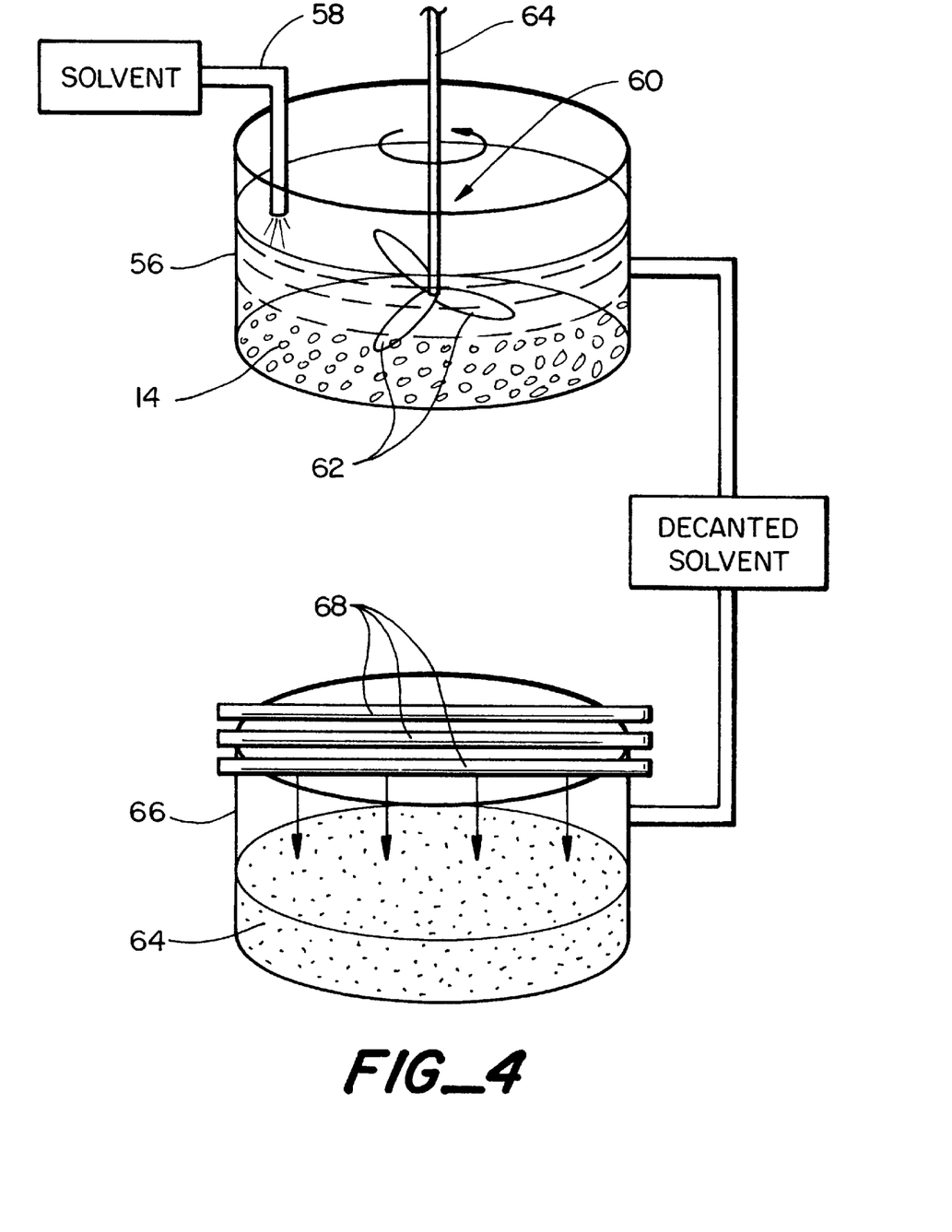
FIG. 4 shows a schematic flow chart showing the treatment of coarse soil particles in accordance with the present invention.

For the coarse soil particles, those having a diameter greater than ⅜ inch, the particle size and resulting gaps between the adjacent particles interferes with the upward migration of the solvent through the particles via capillary action or unsaturated flow. FIG. 4 shows the treatment of the coarse soil particles 14 in accordance with this invention. The coarse particles 14 are transferred to a treatment vessel 56 and solvent is added to vessel 56 through a delivery conduit 58 until the soil particles are completely submerged. An agitator 60 stirs the soil-solvent mixture in the vessel to encourage extraction of the PCP and PAH contaminants from the coarse soil particles to the solvent solution so that the extracted contaminants may be dissolved by the solvent. In the illustrated embodiment, the agitator 60 includes a plurality of blades 62 mounted to a rotary shaft 64 so that the blades 62 stir the soil-solvent mixture when the shaft is driven. It is to be understood that other agitators may be used to mix the soil-solvent solution in accordance with this invention. In the present embodiment, the agitator 60 is operated to mix the soil-solvent solution for about 30 minutes to 60 minutes, although the stirring time may be increased or decreased if desired.

After the soil-solvent mixture has been mixed, the vessel contents are allowed to stand for a period of time while the coarse soil particles 14 settle to the bottom of the vessel 56. The solvent solution 64 is decanted and transferred to a second vessel 66 where the solution is exposed to a UV radiation source 68. As with the embodiments shown in FIGS. 2 and 3, the UV radiation source provides light having a wavelength of about 200 ηm to 300 ηm for PAH and light having a wavelength of about 300 ηm to 400 ηm for PCP.

The present invention provides a system for efficiently and rapidly treating contaminated soil. By separating the soil sample into fine soil particles and coarse soil particles, both types of soil particles may be efficiently decontaminated. The treatment process using a combination of solvent application, to separate the PCP and PAH molecules from the soil and carry the solute-contaminants to the soil surface, and photodegradation to destroy the contaminant molecules on the soil surface is particularly suitable for use with fine soil particles where the relatively uniform size and spacing of the particles are conducive to unsaturated flow of the solvent through the soil. The gaps between the coarse soil particles 14 interfere with the ability to maintain good migration of the solvent via capillary action. However, PCP and PAHs may be easily removed from the coarse soil particles by saturating the particles with solvent to wash the contaminants from the soil particles. The effectiveness of this treatment process for decontaminating fine soil particles is significantly reduced by the extended amount of time required for the fine soil particles to settle to the bottom of the treatment vessel. Separating the soil sample into fine soil particles and coarse soil particles allows each soil type to be efficiently decontaminated.

The following examples of reducing the amount of PCP and PAH in contaminated soil demonstrate the effectiveness of treating the fine soil particles 12 using the embodiment shown in FIG. 2. Photoremediation of PCP and PAHs in accordance with the present invention was achieved by (1) preparation of the fine soil particles, (2) enhanced upward geochemical mobilization of the contaminants to the soil surface, and (3) photolysis of the contaminants at the soil surface. Parameters affecting the rate of degradation include UV light type, solvent type, geochemical mobilization rate, and photolysis rate, as well as the composition of the soil:contaminant matrix and the amount of treatment required.

EXAMPLE #1

Poleyard Soil

In the first example, contaminated poleyard soil was taken from a wood pole storage yard where wooden utility poles had been stored for approximately 40 years. The stored poles were of the type which had been treated with a creosote/PCP to preserve the wood. The poleyard soil sample was contaminated with both PCP and PAHs. Prior to testing, the soil sample was homogenized and air dried for 24 hours. The characteristics of the air-dried soil are set forth in Table 1.

TABLE 1

| POLEYARD SOIL CHARACTERISTICS | |
| --- | --- |
| CHARACTERISTICS | POLEYARD SOIL |
| Texture | sandy loam |
| Sand (%) | 68 |
| Silt (%) | 20 |
| Clay (%) | 12 |
| Organic Carbon (%) | 2.9 |
| pH | 4.7 |
| Bulk Density (g/cm$^3$) | 1.3 |
| Porosity (%) | 51 |
| Saturation (%) | 32 |
| Field Capacity (⅓ bar) (%) | N/A |
| Wilting Point (15 bar) (%) | N/A |

The field capacity and wilting point of the poleyard soil could not be determined because of the oily nature of the soil.

Figure 5:
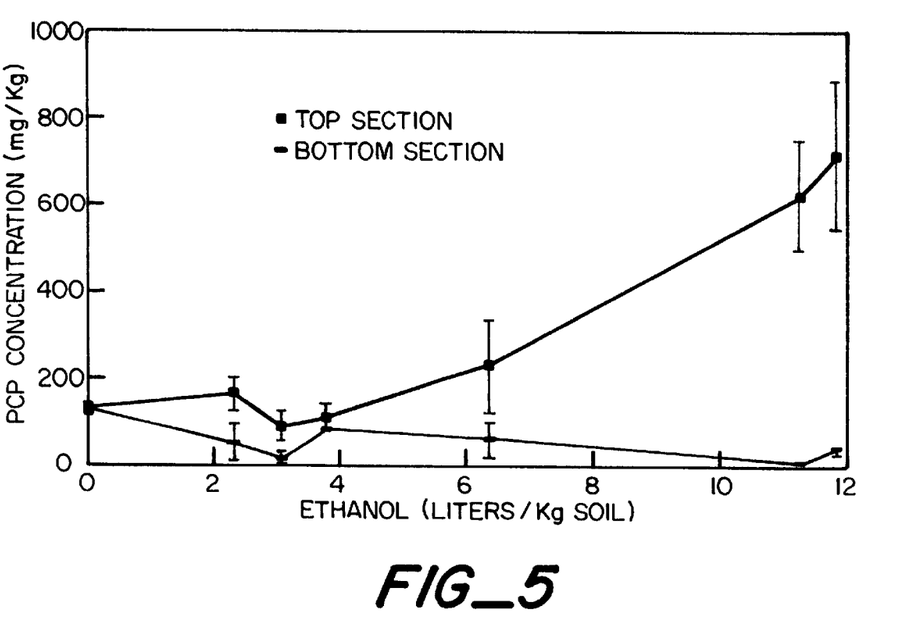
FIG. 5 shows a graphical representation of the PCP concentration in a poleyard soil sample following the periodic addition of an ethanol solution to the soil sample.
Figure 6:
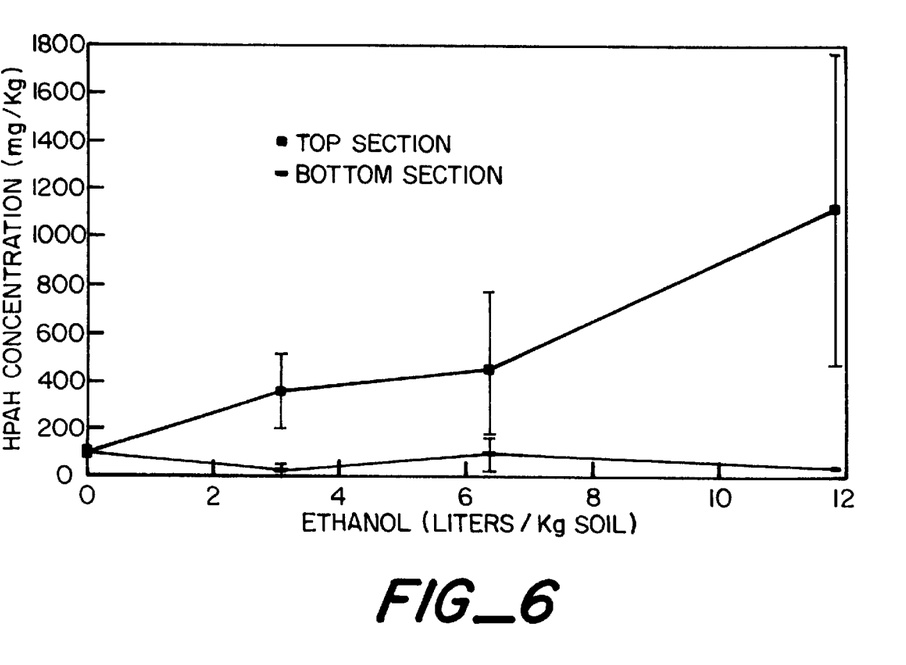
FIG. 6 shows a graphical representation of the PAH concentration in a poleyard soil sample following the periodic addition of an ethanol solution to the soil sample.

The soil was sieved to remove the fine soil particles 12 from the sample, and then the fine soil particles were air dried and placed in a reactor 28 for treatment. The depth of the soil particles 12 in the reactor 28 was about 17 cm (7 inches). An ethanol solution was injected into the bottom of the reactor 28 on a daily basis, adding about 150 mL of ethanol solution per kilogram of soil. The soil in the reactor was sampled periodically, with soil being extracted from both the top section and bottom section of the soil layer within the reactor. The sampled soil was analyzed to determine the amount of PCP and PAH in the sample. FIG. 5 and 6 show the amount of PCP and PAH in the top and bottom sections of the soil, in milligrams per kilogram of soil, over time based upon the amount of solvent added to the reactor. As is shown in both Figures, the level of PCP and PAH in the top section of the soil increases dramatically while the amount in the bottom section decreases, indicating that the contaminants are carried toward the surface of the soil by the upward migration of the solvent through the soil matrix.

Figure 7:
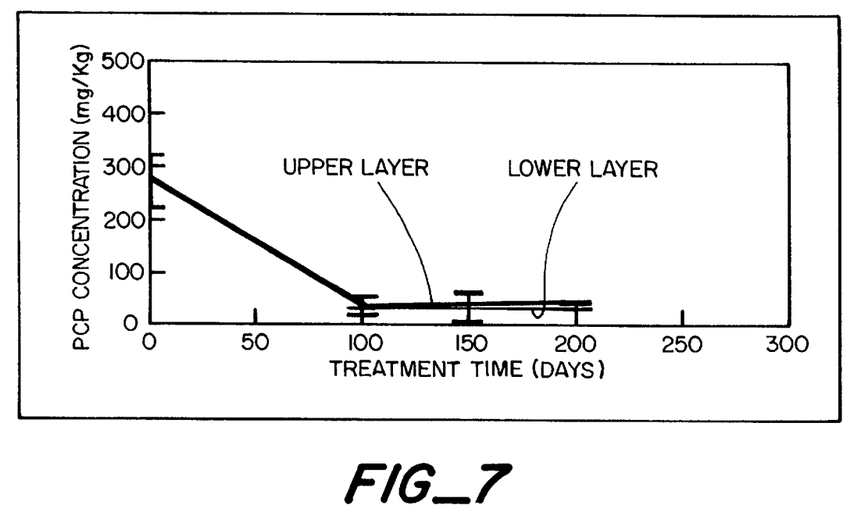
FIG. 7 shows a graphical representation of the PCP concentration in a poleyard soil sample over time during treatment of the sample in accordance with the present invention.
Figure 8:
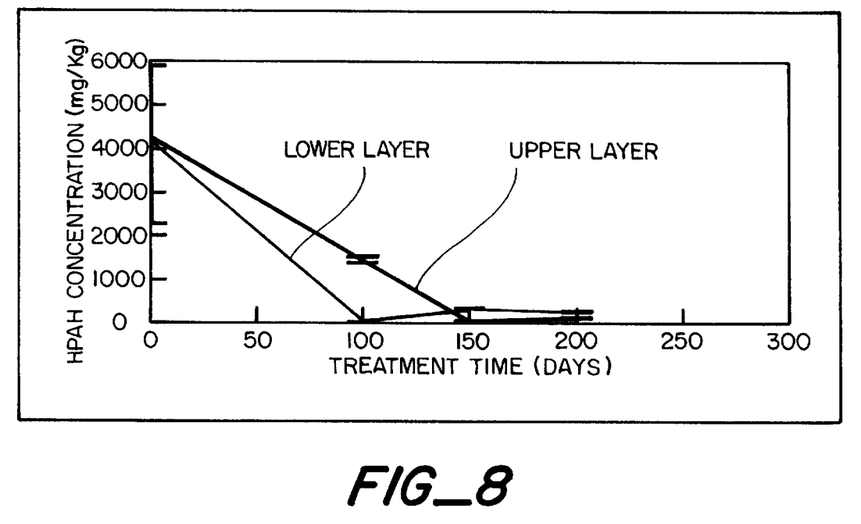
FIG. 8 shows a graphical representation of the PAH concentration in a poleyard soil sample over time during treatment of the sample in accordance with the present invention.

A sample of fine soil particles 12 of the poleyard soil weighing approximately 1.7 kg was placed in an aluminum reactor 28 to a depth of about 1 cm. Black light fluorescent tubes (40 W) were positioned 20 cm above the surface of the soil to expose the soil to UV radiation. An ethanol solution was injected into the bottom of the reactor 28 at a rate of 250 mL ethanol solution per day. The fine soil particles were sampled periodically by extracting a sample from the upper and lower regions of the soil layer in the reactor 28. For this study, the soil layer was divided into thirds with the top third of the soil representing the upper layer and the bottom two-thirds representing the lower layer. Samples were extracted periodically from each layer and analyzed to determine the amount of PCP and PAH in the soil. FIG. 7 shows the PCP concentration in the fine soil particles over time, while FIG. 8 shows the PAH concentration over time. A control sample, which was exposed to the UV radiation without the addition of solvent, showed no significant decrease in PCP or PAH during the study. The decrease in both PCP and PAH in the fine soil particles demonstrates that the addition of the solvent to the reactor significantly improves the remediation rate.

Figure 9:
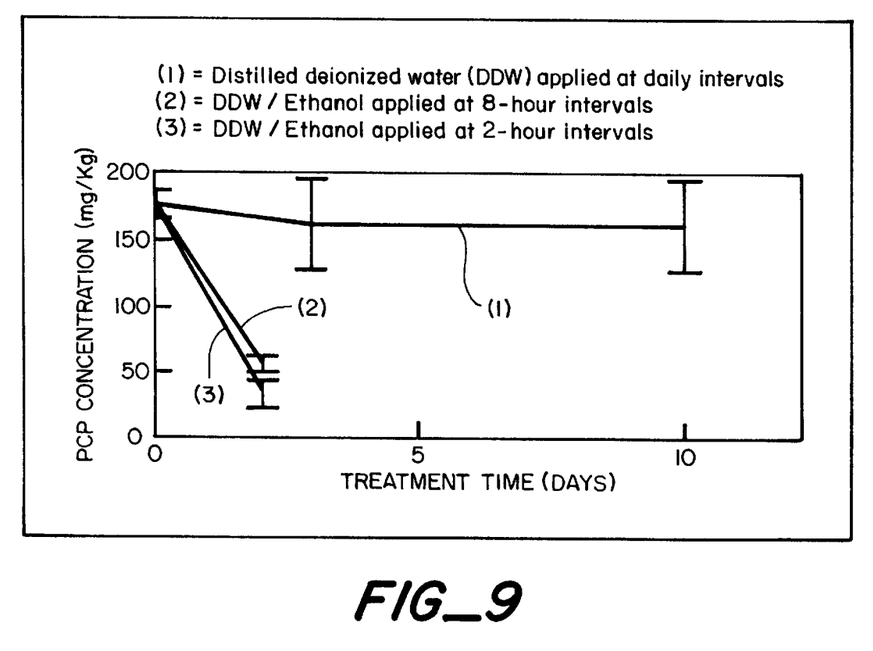
FIG. 9 shows a graphical representation of the PCP concentration in a poleyard soil sample over time during treatment of the sample in accordance with the present invention using a high intensity light source.

Another sample of the fine soil particles 12 of poleyard soil was treated using a different intensity light source. The fine soil particles 12 were positioned in three reactors 28 to a layer of 1 cm in each reactor. In the first reactor, distilled deionized water (DDW) was added to the reactor as a solvent on a daily basis. A mixture of DDW and ethanol (80% DDW to 20% ethanol per volume) was added to the second reactor at eight hour intervals. The same DDW:ethanol mixture was added to the third reactor at two-hour intervals. For each reactor, approximately 30 mL of solvent was added at each application. During the study, the reactors 28 were exposed to a 400 W light source, and the soil was sampled and analyzed periodically to determine the PCP concentration. As is shown in FIG. 9, the photolysis rate of PCP was higher using the higher intensity 400 W light source. In the first reactor, to which DDW was added, only minimal degradation of the PCP occurred because there was no geochemical mass transfer of PCP from the soil interstices into the DDW. Thus, only the PCP exposed on the soil surface was destroyed. In the second and third reactors, where a 20 percent by volume ethanol solvent was added to the soil, the PCP concentration rapidly decreased, dropping to approximately 50 mg/kg soil in less than five days.

EXAMPLE #2

Non-poleyard Soil

In the second example, contaminated soil was taken from the site of a spill of PCP:diesel fuel (35% PCP to 65% diesel by volume). The contaminated soil (non-poleyard soil) included an unacceptable level of PCP. The soil was homogenized and air dried for 24 hours prior to testing. The characteristics of the air-dried soil are set forth in Table 2.

TABLE 2

POLEYARD SOIL CHARACTERISTICS

| CHARACTERISTICS | NON-POLEYARD SOIL |
| --- | --- |
| Texture | silt loam |
| Sand (%) | 16 |
| Silt (%) | 65 |
| Clay (%) | 19 |
| Organic Carbon (%) | 1.8 |
| pH | 6.4 |
| Bulk Density (g/cm$^3$) | 1.2 |
| Porosity (%) | 57 |
| Saturation (%) | 44 |
| Field Capacity (⅓ bar) (%) | 16.8 |
| Wilting Point (15 bar) (%) | 7.4 |

Figure 10:
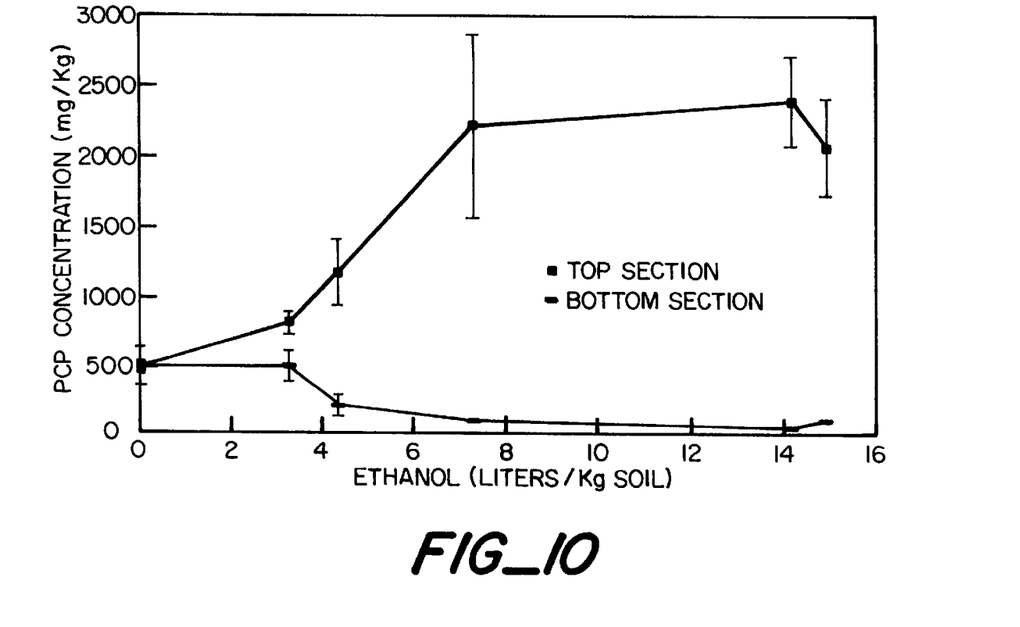
FIG. 10 shows a graphical representation of the PCP concentration in a non-poleyard soil sample following the periodic addition of an ethanol solution to the soil sample.

The non-poleyard soil was sieved to separate the coarse soil particles 14 from the fine soil particles 12, and then the soil particles were air dried and the fine soil particles 12 placed in a reactor 28 for treatment to a depth of about 17 cm (7 inches). About 150 mL ethanol solution per kilogram of soil was injected into the bottom of the reactor 28 on a daily basis. Samples of soil were extracted from the top and bottom sections of the soil layer and analyzed to determine the amount of PCP in the sample. The results are shown in FIG. 10. The amount of soil in the bottom section of the reactor 28 decreased, while the PCP concentration in the top section increased dramatically as the PCP was carried to the surface by the migration of the solvent through the soil matrix.

Figure 11:
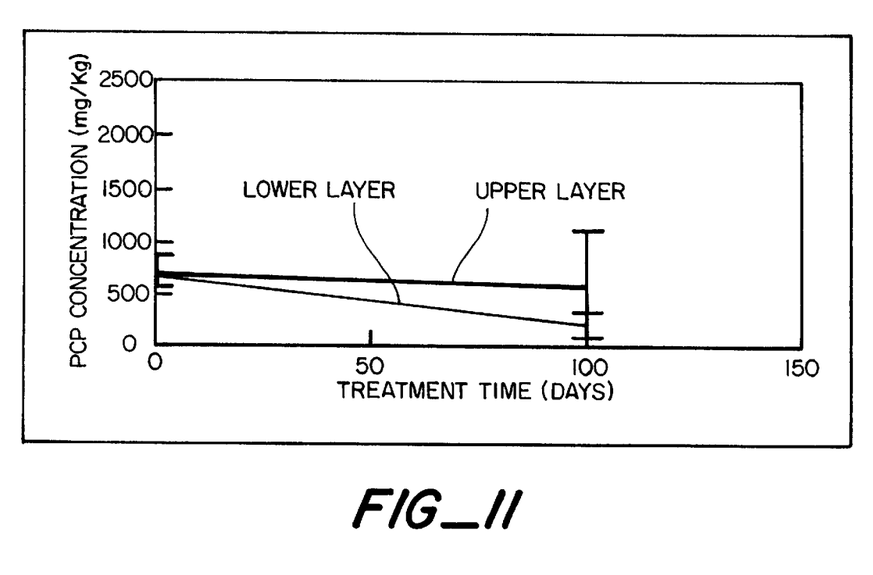
FIG. 11 shows a graphical representation of the PCP concentration in a poleyard soil sample over time during treatment of the sample in accordance with the present invention.

A 1.7 kg sample of the non-poleyard fine soil particles 12 was placed in an aluminum reactor 28 to a depth of about 1 cm. The soil was exposed to a source of ultraviolet radiation provided by black light fluorescent tubes (40 W) positioned about 20 cm above the soil surface. An ethanol solution was injected into the bottom of the reactor 28 at a rate of 250 mL ethanol solution per day. Soil samples were periodically extracted from the upper and lower regions of the soil layer in the reactor 28. As in the previous example, the upper layer consisted of the top ⅓ of the soil in the reactor 28 while the lower layer consisted of the bottom ⅔ of the soil. The samples were analyzed over time to determine the PCP concentration in the soil. FIG. 11 shows the PCP concentration in the fine soil particles over time.

EXAMPLE #3

Preservative Treatment Area Soil

Figure 12:
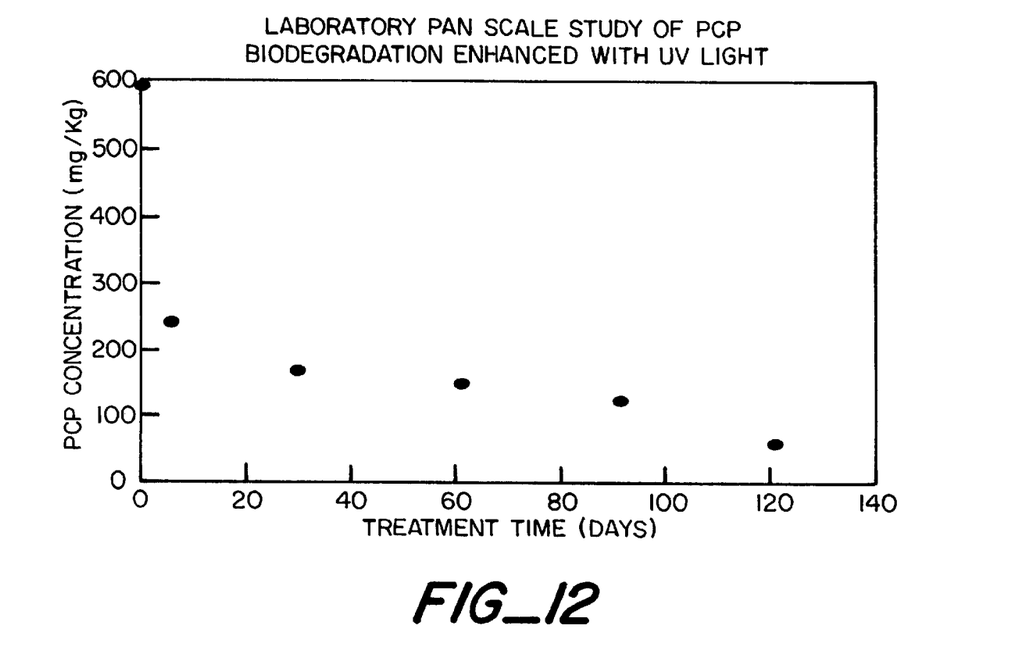
FIG. 12 shows a graphical representation of the PCP concentration in a preservative treatment area soil sample over time during treatment of the sample in accordance with the present invention.

In the third example, the sample of PCP contaminated soil was taken from a location where wooden crossarms are treated with a PCP-containing preservative. Unlike the previous examples, the treatment area soil included a substantial amount of coal dust which influenced the effectiveness of the treatment. The soil was sieved to separate the coarse soil particles 14 from the fine soil particles 12, and the fine soil particles were air dried and placed in a reactor 28 to a depth of about 1 cm. The reactor 28 was exposed to black light fluorescent tubes positioned about 20 cm from the soil surface. The soil was sampled periodically and analyzed to determine the PCP concentration. As is shown in FIG. 12, the PCP concentration in the soil decreased over time, following a pattern similar to the results of the previous examples.

EXAMPLE #4

Non-poleyard Soil—Field Setting Photoremediation

Figure 13:
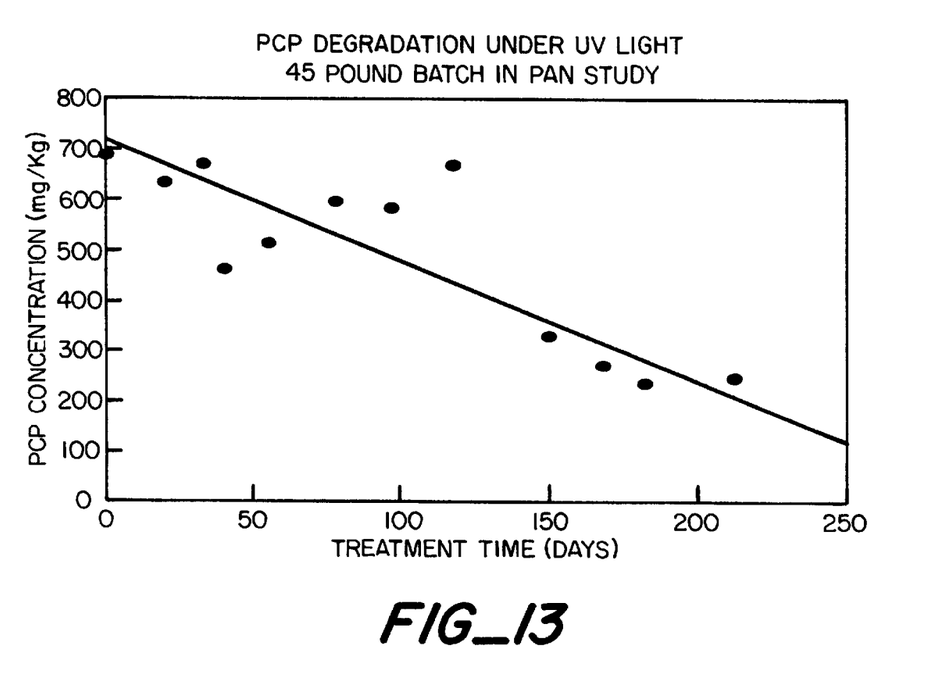
FIG. 13 shows a graphical representation of the PCP concentration in a non-poleyard soil sample over time during treatment of a 45 pound batch of soil in a field study in accordance with the present invention.

In the fourth example, the non-poleyard soil of Example #2 was studied in a field setting simulated in an uninsulated metal storage building located in a utility warehouse complex located in the Pacific Northwest. The non-poleyard fine soil particles 12 were separated from the soil and transferred to metal pans, each pan containing approximately 45 pounds of soil having a depth of about 10 cm. Ethanol solution was injected into each pan on a weekly basis at the rate of about 5 mL per week. UV lamps similar to the black light fluorescent tubes employed in the previous examples were distributed across the pans. The soil in each pan was sampled to determine the PCP concentration of the soil, and the average PCP concentration over time is shown in FIG. 13. As is shown in FIG. 13, the PCP concentration steadily decreased during the study.

Figure 14:
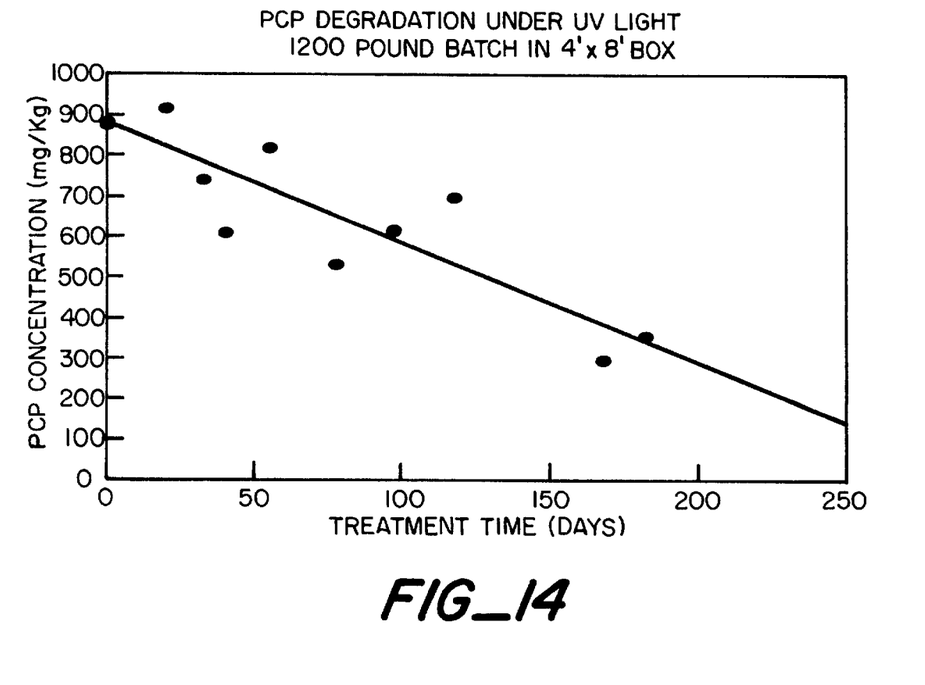
FIG. 14 shows a graphical representation of the PCP concentration in a non-poleyard soil sample over time during treatment of a 1200 pound batch of soil in a field study in accordance with the present invention.

During this study, a reactor 28 measuring four feet by eight feet by two feet was filled with about 1200 pounds of non-poleyard fine soil particles to a depth of about six inches. Solvent was added to the soil and the reactor 28 was exposed to a bank of 40 W UV lamps. The soil in the reactor was periodically sampled and analyzed to measure PCP concentration levels, the results of which are shown in FIG. 14. As with the smaller treatment batches, the PCP concentration level steadily decreased as the PCP molecules were carried to the soil surface and destroyed by photolysis.

EXAMPLE #5

Poleyard Soil—Full Scale Field Remediation

Figure 15:
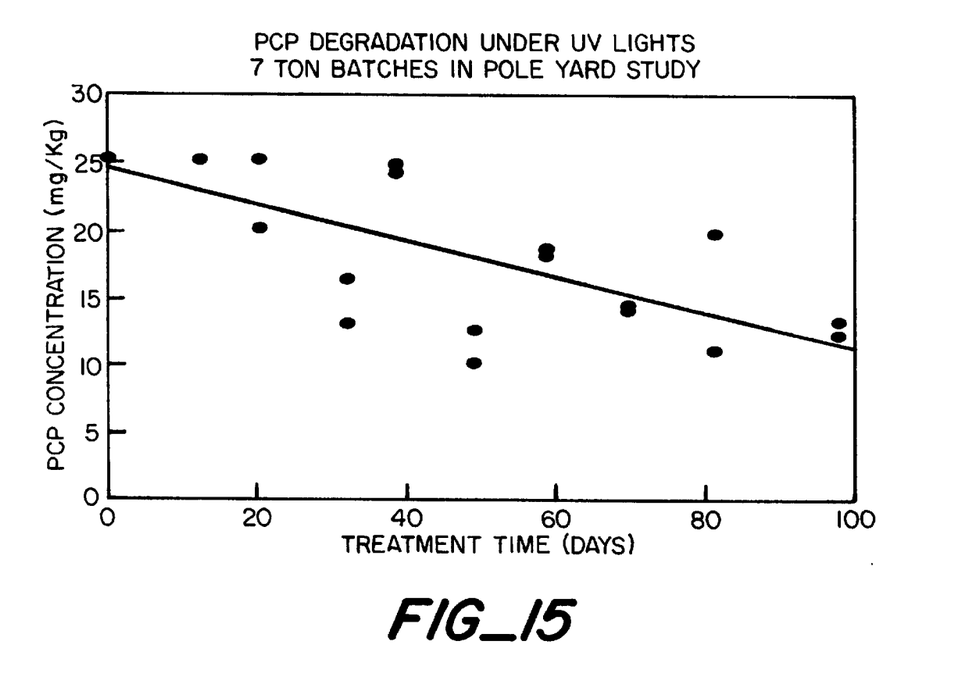
FIG. 15 shows a graphical representation of the PCP concentration in a poleyard soil sample over time during full scale remediation of the sample in accordance with the present invention.
Figure 16:
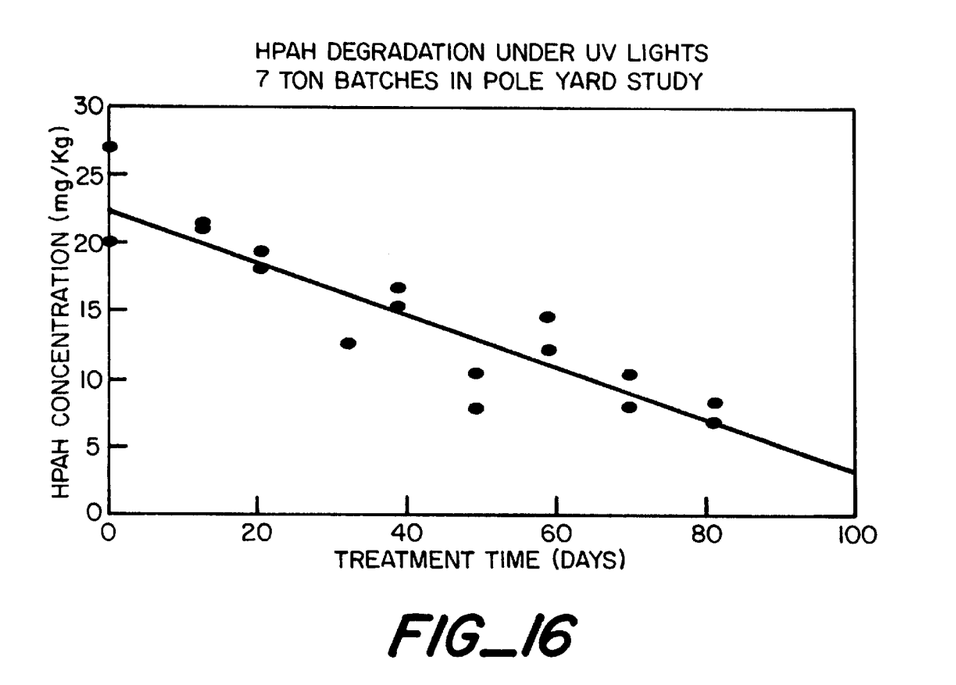
FIG. 16 shows a graphical representation of the PAH concentration in a poleyard soil sample over time during full scale remediation of the sample in accordance with the present invention.

In the fifth example, the poleyard soil of Example #1 was treated in a full scale field remediation study. The study was conducted in a large tent erected on the utility poleyard. The tent housed several reactors 28 each holding about 7 tons of fine soil particles having a depth of about 30 cm. The reactors 28 included an underdrain which was used to inject an ethanol:water nutrient solution though the bottom layer of soil in the reactor 28. Banks of UV lamps positioned above the reactors 28 supplied the UV radiation for photolysis of the PCP and PAH contaminants. Samples were periodically extracted from the reactor 28 and tested to measure PCP and PAH concentration levels. As is shown in FIGS. 15 and 16, the PCP and PAH concentrations decreased during the full scale field remediation in a manner consistent with the results in the previous examples.

Figure 17:
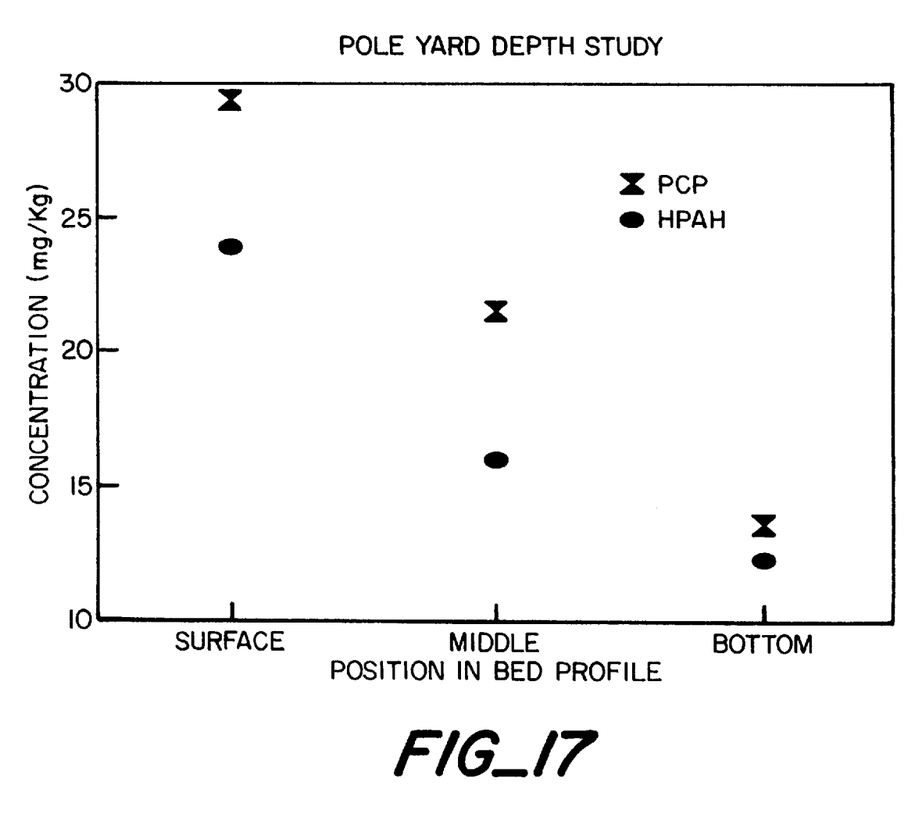
FIG. 17 shows a graphical representation of the PCP and PAH concentration in a poleyard soil sample relative to the depth of the soil sample during full scale remediation of the sample in accordance with the present invention.

Every seven days samples were extracted from the soil surface and at the middle and bottom of the reactor to determine the PCP and PAH concentration relative to the depth of the sampled soil. As is shown in FIG. 17, the PCP and PAH concentration is highest at the soil surface and lowest at the bottom of the reactor 28. This demonstrates the upward migration of the contaminants through the soil matrix with the unsaturated flow of the solvent.

The photolysis rates and half life values for PCP and PAH for each of the preceding examples are shown in Table 3 and Table 4 for the previous examples where the soil was treated using a 40 W light source. In the following tables, the rate constant k (days$^{-1}$) is calculated using a first-order kinetic model for photolysis.

TABLE 3

PHOTOLYSIS RATE AND HALF-LIFE VALUES FOR PCP
(TREATMENT WITH 40 W UV LIGHT)

| Soil Type | k (days$^{-1}$) | Half-life days ($T_{1/2}$) |
|---|---|---|
| Poleyard Soil (Example #1) | 0.023 | 30 |
| Non-Poleyard Soil (Example #2) | 0.011 | 63 |
| Preservation Treated Soil (Example #3) | 0.025 | 28 |
| Non-Poleyard Soil Field Study (45 lb) (Example #4) | 0.004 | 159 |
| Non-Poleyard Soil Field Study (1200 lb) (Example #4) | 0.008 | 80 |
| Poleyard Soil Full Scale Field Remediation (Example #5) | 0.007 | 93 |

TABLE 4

PHOTOLYSIS RATE AND HALF-LIFE VALUES FOR PAH
(TREATMENT WITH 40 W UV LIGHT)

| Soil Type | k (days$^{-1}$) | Half-life days ($T_{1/2}$) |
|---|---|---|
| Poleyard Soil (Example #1) | 0.039 | 18 |
| Poleyard Soil Full Scale Field Remediation (Example #5) | 0.011 | 65 |

As shown in Tables 3 and 4, the photolysis rate varied depending upon the soil being treated and tested. The photolysis rates for the field study and full scale remediation samples (Examples 4 and 5) were greater than the rates for the laboratory studies, suggesting the depth of the soil is an important factor in treatment efficiency. The embodiment shown in FIG. 3 may be used to reduce the depth of the soil during treatment.

Table 5 shows the photolysis rates and half-life values for the treatment of poleyard soil with a 400 W light source, discussed in Example 4. In the following tables, the rate constant k (days$^{-1}$) is calculated using a first-order kinetic model for photolysis.

TABLE 5

PHOTOLYSIS RATE AND HALF-LIFE VALUES FOR
PCP IN POLEYARD SOIL
(TREATMENT WITH 400 W UV LIGHT-EXAMPLE #5)

| Treatment | k (days$^{-1}$) | Half-life days ($T_{1/2}$) |
|---|---|---|
| Distilled Deionized Water (DDW) Added Daily | <0.001 | greater than 693 |
| DDW:Ethanol (80% vol:20% vol) Added at 8 hour Intervals | 0.59 | 1.2 |
| DDW:Ethanol (80% vol:20% vol) Added at 2 hour Intervals | 0.86 | 0.8 |

Comparing Tables 3 and 5, it is noted that the higher 400 W intensity light source degrades the PCP at a greater rate. Furthermore, increasing the frequency at which solvent is added to the soil also improves the photolysis rate. For minimizing treatment time, the solvent is preferably added continuously to the soil at a rate sufficient to maintain unsaturated flow. As is shown in Table 5, using distilled deionized water as a solvent does not satisfactorily extract the PCP from the soil particles and transport the PCP to the soil surface for treatment. Although not illustrated in these examples, it is to be understood that solvents other than DDW:ethanol may be used for photoremediation of the soil.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A process for reducing contaminants in a soil sample comprising the steps of:

separating the soil sample into a first portion having fine soil particles and a second portion having coarse soil particles;

applying solvent to the fine soil particles to extract the contaminants from the fine soil particles and dissolve the contaminants in the solvent;

radiating the surface of the fine soil particles with ultraviolet light having a wavelength to produce photolysis of the contaminants to reduce the contaminants in the fine soil particles; and separately reducing the amount of contaminants in the coarse soil particles.

2. The process of claim 1 in which said step of separating the soil sample includes separating the soil sample into a first portion having fine soil particles having a maximum diameter less than ⅜ inch.

3. The process of claim 1 in which said step of applying the solvent to the fine soil particles includes positioning the fine soil particles in a reactor and injecting the solvent into the bottom of the reactor at a rate selected to produce upward migration of the solvent through the fine soil particles by capillary action.

4. The process of claim 1 in which said step of applying the solvent to the fine soil particles includes depositing a layer of fine soil particles on a conveyor and repeatedly spraying the fine soil particles carried by the conveyor with the solvent, said step of radiating the surface layer being conducted alternately with the steps of spraying of the fine soil particles with the solvent.

5. The process of claim 1 in which said step of applying the solvent to the fine soil particles includes applying an ethanol solution to the fine soil particles.

6. The process of claim 1 in which the contaminants are polycyclic aromatic hydrocarbons, and the step of radiating the fine soil particles includes radiating the fine soil particles with ultraviolet light having a wavelength in the range of 200 ηm to 300 ηm.

7. The process of claim 1 in which the contaminants is a chlorinated phenol, and the step of radiating the fine soil particles includes radiating the fine soil particles with ultraviolet light having a wavelength in the range of 300 ηm to 400 ηm.

8. The process of claim 1 in which said step of separately reducing the contaminants in the coarse soil particles includes mixing the coarse soil particles with a solvent and, after the mixing step, removing the solvent from the coarse soil particles.

9. The process of claim 8 in which said step of separately reducing the contaminants in the coarse soil particles includes radiating the solvent with dissolved contaminants with ultraviolet light having a wavelength selected to produce photolysis of the contaminants.

10. A process for removing contaminants from a soil sample comprising the steps of:

removing fine soil particles from the course soil particles;

reducing the contaminants in the fine soil particles by applying a solvent to the fine soil particles to dissolve the contaminants carried by the fine soil particles and exposing the surface of the fine soil particles to ultraviolet light having a wavelength selected to degrade the contaminants; and reducing the contaminants in the coarse soil particles by mixing the coarse soil particles with a solvent to dissolve the contaminants carried by the coarse soil particles, removing the solvent from the coarse soil particles and exposing the removed solvent to an ultraviolet light having a wavelength selected to degrade the dissolved contaminants.

11. The process of claim 10 in which the step of removing the fine soil particles from the soil sample includes removing fine soil particles having a maximum diameter less than $\frac{3}{8}$ inch.

12. The process of claim 10 in which the step of reducing the contaminants in the fine soil particles includes positioning the fine soil particles in a reactor and injecting the solvent into the bottom of the reactor at a rate selected to produce upward migration of the solvent through the fine soil particles by capillary action.

13. The process of claim 10 in which the step of reducing the contaminants in the fine soil particles includes positioning the fine soil particles on a conveyor and spraying the fine soil particles with the solvent at a plurality of spraying locations spaced along the length of said conveyor.

14. The process of claim 13 in which said step of reducing the contaminants in the fine soil particles includes exposing the fine soil particles to the ultraviolet light at a plurality of light exposure locations spaced along said conveyor, said light exposure locations being separated by said spraying locations.

15. The process of claim 10 in which the contaminants are polycyclic aromatic hydrocarbons, and in which the step of reducing the amount of contaminants in said fine soil particles includes exposing the fine soil particles to ultraviolet light having a wavelength in the range of 200 ηm to 300 ηm.

16. The process of claim 10 in which the contaminants are chlorinated phenols, and in which the step of reducing the contaminants in said fine soil particles includes exposing the fine soil particles to ultraviolet light having a wavelength in the range of 300 ηm to 400 ηm.

17. The process of claim 10, and further comprising the step of measuring the amount of contaminants in the coarse soil particles after the solvent is removed therefrom and, if the amount of contaminants is greater than a predetermined value, repeating the step of reducing the amount of contaminants in the coarse soil particles.

* * * * *